United States Patent
Ha et al.

(10) Patent No.: US 9,079,561 B1
(45) Date of Patent: Jul. 14, 2015

(54) APPARATUS FOR CONTROLLING SMART AIRBAG SYSTEM USING DUAL CHAMBER STRUCTURE

(71) Applicant: AGENCY FOR DEFENSE DEVELOPMENT, Daejeon (KR)

(72) Inventors: Jaehoon Ha, Daejeon (KR); Seung-Jong Oh, Daejeon (KR); Kyung-Yong Lee, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 14/486,135

(22) Filed: Sep. 15, 2014

(30) Foreign Application Priority Data

Feb. 13, 2014 (KR) .................. 10-2014-0016482

(51) Int. Cl.
| | | |
|---|---|---|
| *B60R 21/16* | (2006.01) | |
| *B60R 21/261* | (2011.01) | |
| *B60R 21/015* | (2006.01) | |
| *B60R 21/264* | (2006.01) | |
| *B60R 21/26* | (2011.01) | |

(52) U.S. Cl.
CPC ......... *B60R 21/261* (2013.01); *B60R 21/01512* (2014.10); *B60R 21/264* (2013.01); *B60R 2021/26017* (2013.01)

(58) Field of Classification Search
USPC ........... 280/736, 740, 741, 742; 102/530, 531
See application file for complete search history.

(56) References Cited

U.S. PATENT DOCUMENTS

| | | | |
|---|---|---|---|
| 5,829,784 A | 11/1998 | Brown et al. | |
| 6,065,774 A | 5/2000 | Cabrera | |
| 6,168,200 B1 * | 1/2001 | Greist et al. | 280/736 |
| 7,185,588 B2 * | 3/2007 | Clark et al. | 102/530 |
| 7,887,091 B1 * | 2/2011 | Cox et al. | 280/741 |
| 8,047,569 B2 * | 11/2011 | Cox et al. | 280/736 |
| 8,191,927 B2 * | 6/2012 | Jordan et al. | 280/741 |
| 8,764,054 B2 * | 7/2014 | Mayville et al. | 280/736 |
| 2001/0028164 A1 | 10/2001 | Saso et al. | |
| 2002/0144621 A1 * | 10/2002 | McFarland et al. | 102/530 |
| 2009/0301601 A1 * | 12/2009 | Enerson et al. | 141/38 |
| 2011/0221174 A1 * | 9/2011 | Cox et al. | 280/741 |
| 2012/0079958 A1 * | 4/2012 | Nakayasu | 102/530 |

FOREIGN PATENT DOCUMENTS

| | | |
|---|---|---|
| JP | 2011-098674 A | 5/2011 |
| KR | 10-1999-0005606 A | 1/1999 |
| KR | 20-2000-0009638 U | 6/2000 |
| KR | 10-2004-0079711 A | 9/2004 |

* cited by examiner

*Primary Examiner* — Toan To
(74) *Attorney, Agent, or Firm* — LRK Patent Law Firm (57) ABSTRACT

An apparatus for controlling a smart airbag system using a dual chamber structure may include a gas generator to eject hot gas at the time of a car crash, a gas chamber which receives the hot gas ejected from the gas generator and transfers the hot gas into an airbag, and a fluid chamber which cools the hot gas by spraying stored fluid, before it is introduced into the airbag.

15 Claims, 7 Drawing Sheets

APPARATUS FOR CONTROLLING SMART AIRBAG SYSTEM USING DUAL CHAMBER STRUCTURE

CROSS REFERENCE TO RELATED APPLICATION(S)

This application claims the benefit of Korean Patent Application No. 10-2014-0016482, filed on Feb. 13, 2014, the entire contents of which are incorporated herein by reference in its entirety.

TECHNICAL FIELD

Exemplary embodiments of the present invention relate generally to a smart airbag system, and, more particularly, to an apparatus for controlling a smart airbag system using a dual chamber structure.

BACKGROUND

The initial technology for an airbag module employed a pyrotechnic inflator for a driver's front airbag. Further technological advances resulted in the development of a hybrid inflator; which is a combination of the aforementioned pyro type inflator and a compressed air type inflator. Additionally, it became standard procedure to equip a vehicle with several airbags including: a passenger's front airbag, side airbags for both the driver and passengers, a curtain airbag, a knee airbag, an advanced airbag, a windshield airbag, and a center airbag, as well as a driver's front airbag. An airbag system reduces an impact on occupants in a vehicle during a crash.

Figure 1:
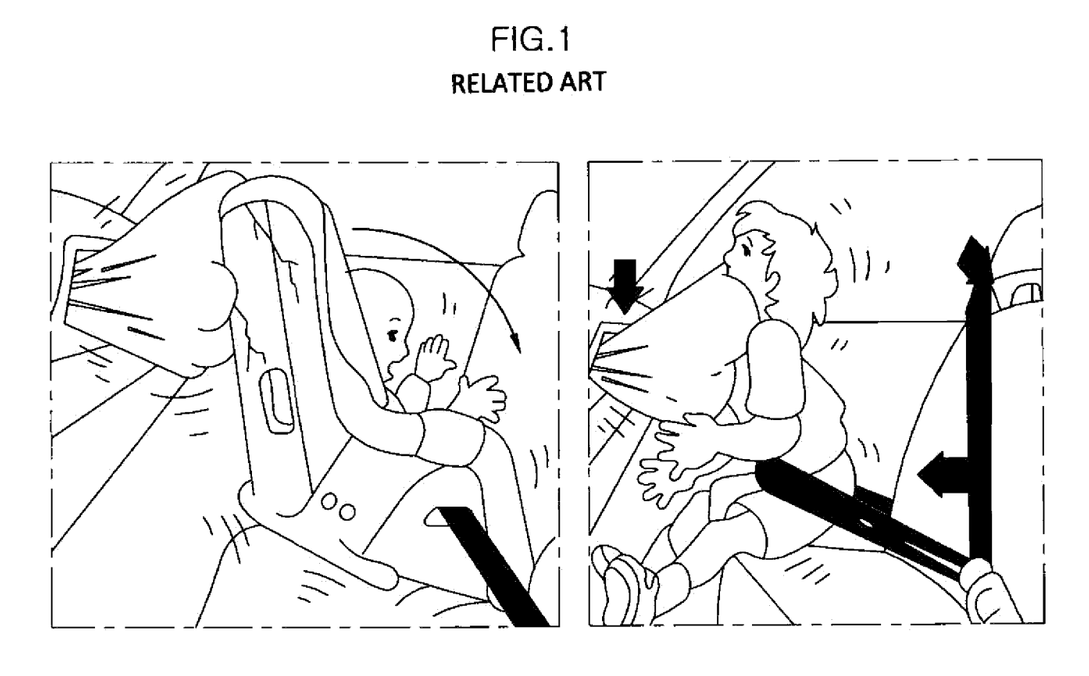
FIG. 1 is a schematic diagram describing an example of an accident involving a child, attributable to an airbag.

Nevertheless, a conventional airbag system presents the risk of causing a secondary accident during a car crash. FIG. 1 is a schematic diagram illustrating an accident involving a child, attributable to an airbag. With reference to FIG. 1, an airbag immediately inflates upon impact at the time of a car accident. The airbag, which spontaneously inflates at the time of a car crash, is likely to injure a driver or a passenger. For this reason, a driver or passenger is at risk of experiencing a secondary injury, such as suffocation, due to inflation of an airbag during a crash. Alternatively, if a deployed airbag is torn apart by an external impact, a hot gas inside the airbag is released, thereby burning a driver or a passenger.

SUMMARY

Accordingly, the present invention has been made keeping in mind the above problems occurring in the prior art, and an object of the present invention is to provide an apparatus for controlling a smart airbag system using a dual chamber structure which can sufficiently cool the gas used for inflating an airbag, so as to reduce the risk of burns to human flesh during airbag deployment.

Another object of the present invention is to provide an apparatus for controlling a smart airbag system using a dual chamber structure, the apparatus being capable of calculating an optimum inflation force for an airbag based upon information about an occupant in a vehicle, and to control the flow of gas.

In order to accomplish the above object, the present invention provides an apparatus for controlling a smart airbag system using a dual chamber structure including: a gas generator which ejects hot gas when a crash occurs; a gas chamber which is supplied with the hot gas ejected from the gas generator and transfers the hot gas into an airbag; a fluid chamber which cools the hot gas by spraying stored fluid before the hot gas is introduced into the airbag; a piston which is installed in the chamber and compresses the fluid using the hot gas; a safety bursting disk which is burst by being pressed by the piston so that the fluid is sprayed and the hot gas is cooled; a gas hole size adjusting unit which changes a size of a gas hole, which is a factor in determining an amount of the cooled gas injected into the airbag; and a controller which controls operation of the gas generator or the gas hole size adjusting unit according to an inflation force for the airbag, which is calculated using occupant information generated by a sensor.

The gas generator may include a plurality of gas generators.

The gas hole size adjusting unit may include: a fixed plate with a plurality of holes; a rotating plate with a plurality of holes which is arranged to correspond to the holes of the fixed plate and through which the cooled gas moves to the airbag; and a motor which drives the rotating plate to rotate via a gear.

The occupant information may include at least one information item selected from among: information about presence and absence of an occupant, information about whether an occupant is wearing a seat belt, information about presence and absence of a child seat, information about a height of an occupant, information about a weight of an occupant, and information about a seating posture of an occupant.

The occupant information may be generated from a detection value measured by at least one sensor selected from among: a seat position sensor, a seat belt buckle sensor, a child seat detection sensor, an occupant position sensor, an infrared sensor, an ultrasonic sensor, and an occupant weight sensor.

The fluid may be a coolant.

The safety bursting disk may include a plurality of safety bursting disks.

The apparatus may further include a stand pipe which separates the gas chamber and the fluid chamber from each other and functions to guide motion of the piston.

According to another aspect, there is provided an apparatus for controlling a smart airbag system using a dual chamber structure; the apparatus including: a gas generator which ejects hot gas when a crash occurs; a fixed body which is supplied with the hot gas ejected from the gas generator; a rotating body which cools the hot gas by spraying stored fluid before the gas is introduced into an airbag, by rotating along an outside surface of a portion of the fixed body in a circumferential direction; a safety bursting disk which is burst via pressing force from the rotating body, exerted as the rotating body rotates; a gas hole size adjusting unit which varies a size of a gas hole, which is a determining factor for an amount of the cooled gas injected into the airbag; and a controller which controls operation of the gas generator or the gas hole size adjusting unit according to an inflation force for the airbag, which is generated from occupant information generated by a sensor.

The gas hole size adjusting unit may include: a fixed plate with a plurality of holes; a rotating plate with a plurality of holes which is arranged to correspond to the holes of the fixed plate and through which the cooled gas moves into the airbag; and a motor which drives the rotating plate via a gear.

In the apparatus, an outside surface of a portion of the fixed body and an inside surface of a portion of the rotating body have respective screw threads.

The apparatus may further include: a motor; a first gear connected to the motor; and a second gear formed on an outside surface of a portion of the rotating body.

The first gear and the second gear may be worm gear type or pulley-and-belt type.

The apparatus may further include a stand pipe disposed inside the rotating body, the stand pipe functioning as a guide to guide the fixed body.

The apparatus may further include a sealing element which is installed between the fixed body and the inside surface of the rotating body in order to seal either a portion between the stand pipe and the fixed body, or a portion between the fixed body and the rotating body.

The apparatus for controlling a smart airbag system using a dual chamber structure according to one embodiment of the present invention can cool hot gas, generated through combustion of a propellant in a gas generator using coolant stored in a dual chamber.

The apparatus for controlling a smart airbag system using a dual chamber structure according to one embodiment of the present invention can calculate an optimum inflation force for an airbag, based upon information about an occupant in a vehicle, and control the flow of a gas by controlling operation of multiple gas generators according to the calculated optimum inflation force for an airbag.

The apparatus for controlling a smart airbag system using a dual chamber structure according to one embodiment of the present invention can calculate an optimum inflation force for an airbag from information about an occupant in a vehicle and control the flow of a gas introduced into the airbag according to the calculated optimum inflation force for an airbag.

The apparatus for controlling a smart airbag system using a dual chamber structure according to one embodiment of the present invention can prevent impact accidents (also called collision accidents) attributable to an impact from an airbag and burn accidents attributable to leakage of hot gas during a car crash, by controlling the flow of cooled gas introduced into an airbag according to calculated optimum inflation force for an airbag.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Embodiments of the present invention will be described in detail with reference to the accompanying drawings. These embodiments will be described in detail in order to allow those skilled in the art to practice the present invention. It should be appreciated that various embodiments of the present invention are different, but are not necessarily exclusive. For example, specific shapes, configurations, and characteristics described in an embodiment of the present invention may be implemented in another embodiment without departing from the spirit and the scope of the present invention. In addition, it should be understood that positions and arrangements of individual components in each disclosed embodiment may be changed without departing from the spirit and the scope of the present invention. Therefore, the detailed description provided below should not be construed as being restrictive. In addition, the scope of the present invention is defined only by the accompanying claims and their equivalents if appropriate.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

First, the following terms will be defined to help understanding an apparatus for controlling a smart airbag system using a dual chamber structure according to exemplary embodiments.

The term "occupant information" used in describing exemplary embodiments of the present invention means information including at least one information item among: information about presence and absence of an occupant, information about whether an occupant is wearing a seat belt, information about presence and absence of a child seat, information about the height of an occupant, information about the weight of an occupant, and information about the seating posture of an occupant.

In exemplary embodiments of the present invention, the occupant information can be produced from detection values measured by a plurality of sensors, such as a seat position sensor, a seat belt buckle sensor, a child seat detection sensor, an occupant position sensor, an infrared sensor, an ultrasonic sensor, and an occupant weight sensor.

The term "optimum inflation force for an airbag" herein means an optimum inflation force which reduces secondary safety accidents attributable to deployment of an airbag.

The optimum inflation force can be calculated from the occupant information. That is, the optimum inflation force for each airbag mounted in a vehicle may vary according to the occupant information.

In embodiments of the present invention, the optimum occupant information may be one of factors which are considered when controlling the flow of hot gas injected into a gas chamber from one gas generator provided for the apparatus for controlling a smart airbag system using a dual chamber structure according to one embodiment of the present invention.

In addition, the optimum occupant information may be one of the factors which are considered when controlling the flow of cooled gas injected into a gas chamber from one gas generator provided for the apparatus for controlling a smart airbag system using a dual chamber structure according to one embodiment of the present invention.

Hereinafter, operation of the apparatus for controlling a smart airbag system using a dual-chamber according to a first embodiment of the present invention will be described with reference to FIGS. 2 to 5.

Figure 2:
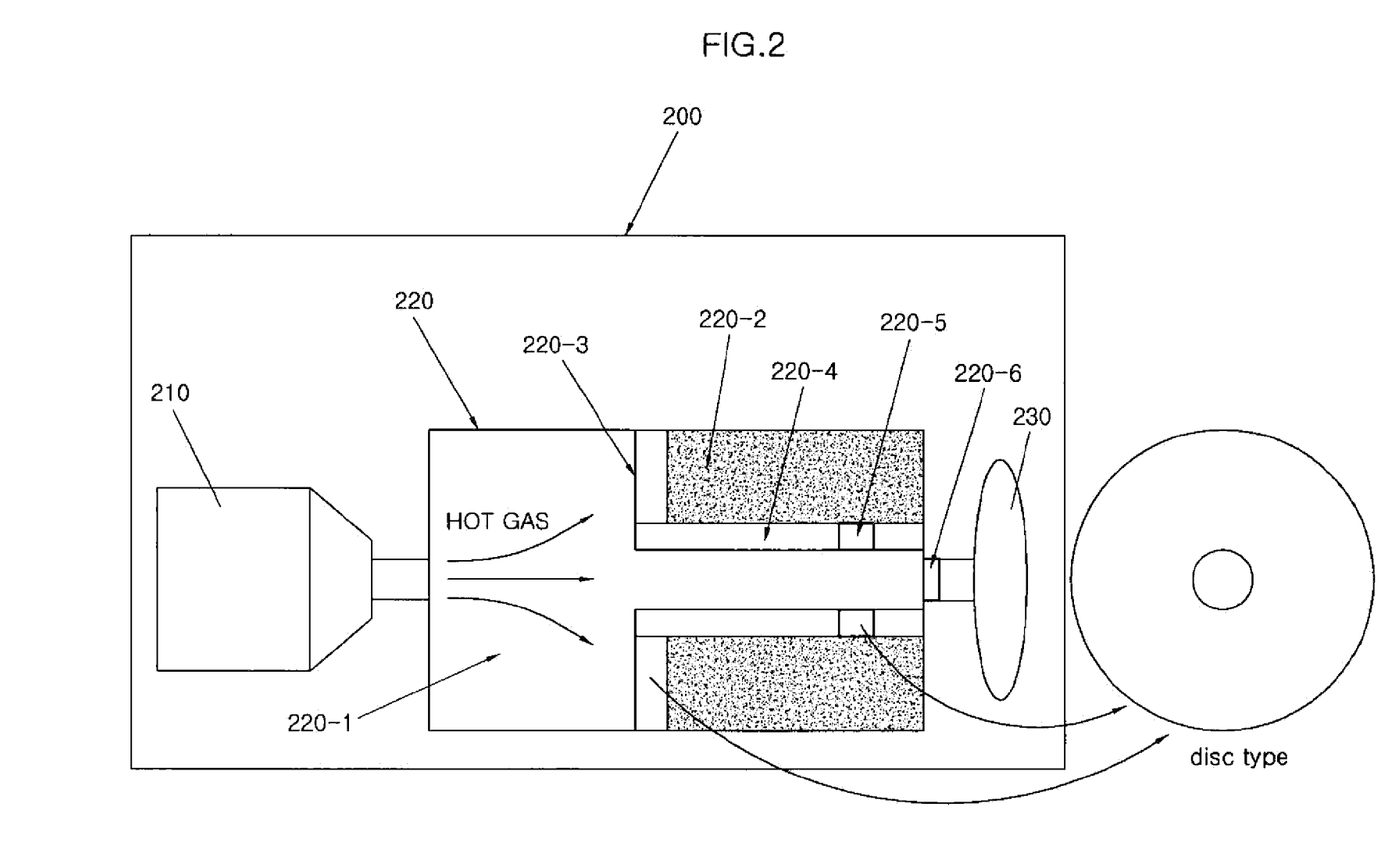
FIG. 2 is a schematic diagram illustrating an apparatus for controlling a smart airbag using a dual chamber structure according to a first embodiment of the present invention.
Figure 3:
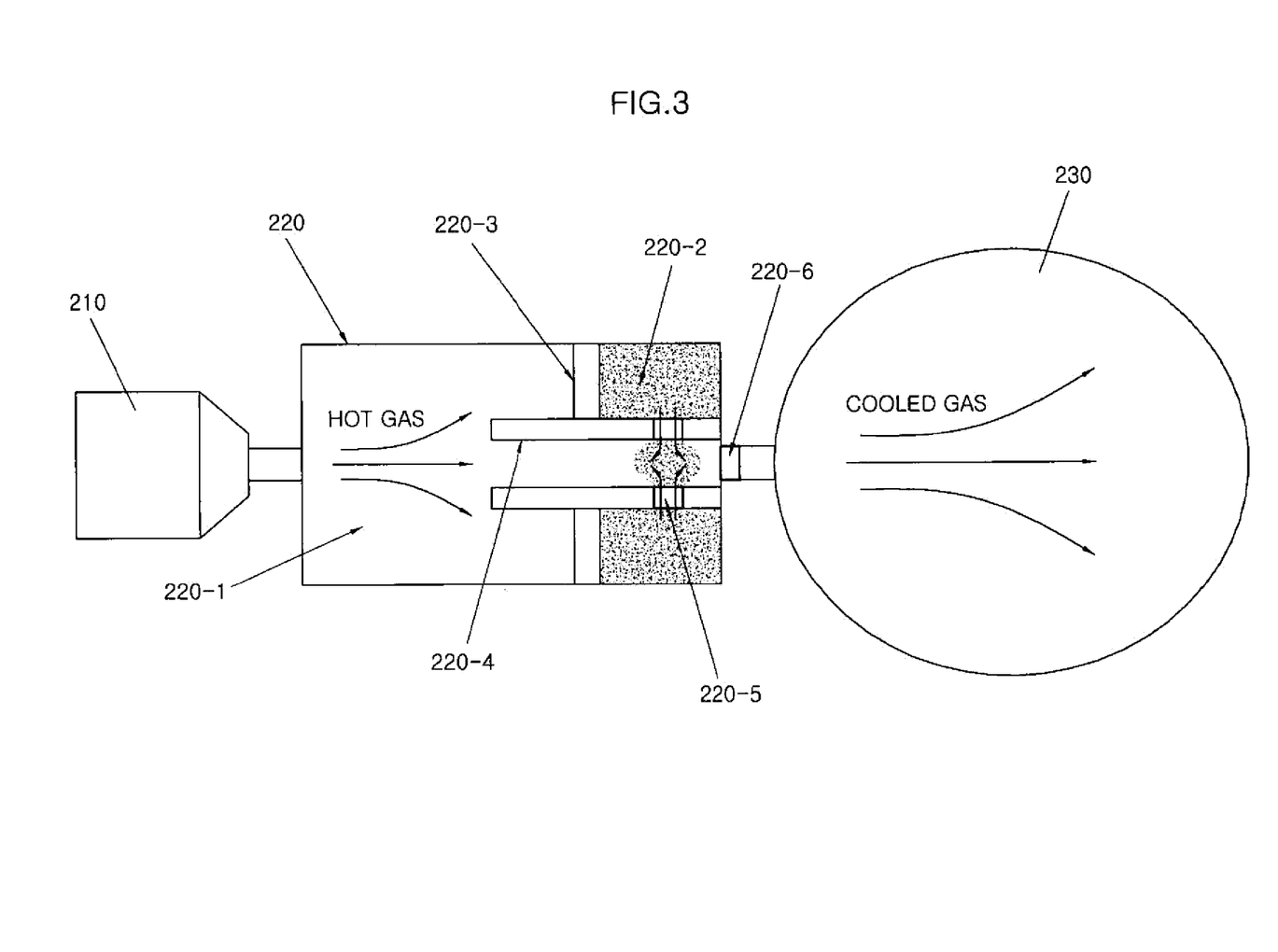
FIG. 3 is a schematic diagram describing the flow of gas controlled by the apparatus for controlling a smart airbag system using a dual chamber structure according to the first embodiment of the present invention.
Figure 4:
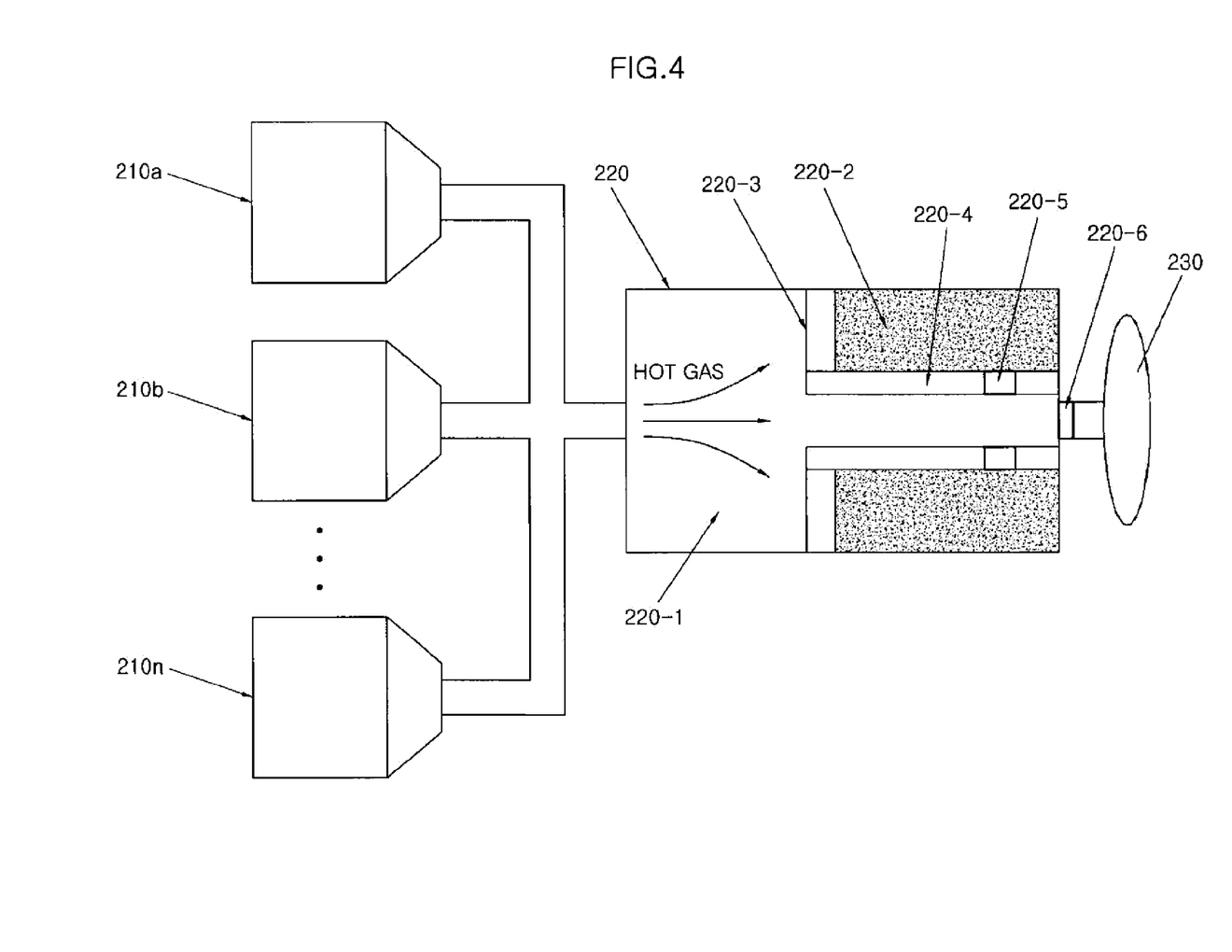
FIG. 4 is a schematic diagram describing the flow of gas controlled by the apparatus for controlling a smart airbag system using a dual chamber structure which is equipped with multiple gas generators according to the first embodiment of the present invention.
Figure 5:
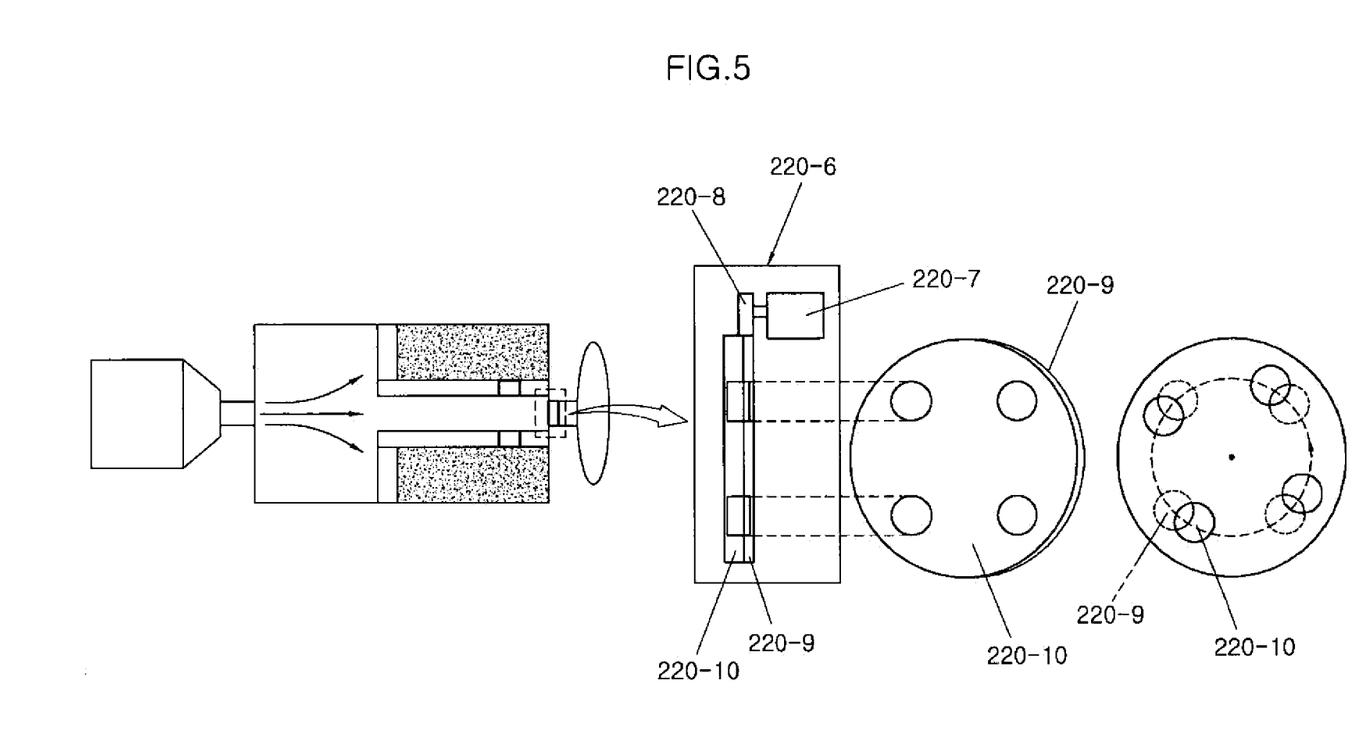
FIG. 5 is a schematic diagram illustrating the size of a gas hole controlled by the apparatus for controlling a smart airbag system using a dual chamber structure according to the first embodiment of the present invention.

FIG. 2 is a schematic view illustrating an apparatus for controlling a smart airbag using a dual chamber structure according to a first embodiment of the present invention. FIG. 3 is a schematic view describing the flow of gas controlled by the apparatus for controlling a smart airbag system using a dual chamber structure according to the first embodiment of the present invention. FIG. 4 is a schematic view describing the flow of gas controlled by the apparatus for controlling a smart airbag system using a dual chamber structure which is equipped with multiple gas generators according to the first embodiment of the present invention. FIG. 5 is a schematic view illustrating the size of a gas hole controlled by the apparatus for controlling a smart airbag system using a dual chamber structure according to the first embodiment of the present invention.

With reference to FIGS. 2 to 5, an apparatus 200 for controlling a smart airbag system using a dual chamber structure includes a gas generator 210, a cooling chamber 220, and an airbag 230.

When a car crash occurs, the gas generator 210 ejects hot gas into a gas chamber 220-1 provided for the cooling chamber 220 while controlling the flow of the hot gas according to the optimum inflation force which is calculated based on the occupant information.

The gas generator 210 may be made up of a plurality of gas generators 210a, 210b, . . . , and 210n. The apparatus 200 for controlling a smart airbag system using a dual chamber structure selects at least one gas generator to eject hot gas into the inside of the gas chamber 220-1, provided for the cooling chamber 220, from among the plurality of gas generators 210a, 210b, . . . , and 210n when a car crash occurs; and can cause the selected gas generator to eject hot gas while controlling the flow of the hot gas according to the optimum inflation force for an airbag calculated from the occupant information.

The cooling chamber 220 may include the gas chamber 220-1, a fluid chamber 220-2, a piston 220-3, a stand pipe 220-4, a safety bursting disk 220-5, and a gas hole size adjusting unit 220-6.

The gas chamber 220-1 receives the hot gas ejected by the gas generator 210 and injects the hot gas into the airbag 230. That is, the gas chamber 220-1 provides a space through which the hot gas ejected from the gas generator 210 travels to the airbag 230.

The fluid chamber 220-2 lowers a temperature of the hot gas by spraying stored fluid, thereby cooling the hot gas, before the gas is introduced into the airbag 230. The fluid may be a coolant.

The piston 220-3 is moved toward the airbag 230 by the pressure of the hot gas which travels through the gas chamber 220-1.

The apparatus 200 for controlling a smart airbag system using a dual chamber structure may be equipped with a motor (not shown) which changes the position of the piston 220-3. The operation of the motor (not shown) is controlled according to the optimum inflation force for the airbag 230, which is calculated from the occupant information, and the position of the piston 220-3 can be changed by this control. The apparatus 200 for controlling a smart airbag system using a dual chamber structure can vary the number of the safety bursting disks 220-4 which are burst by the piston 220-3 by varying the position of the piston 220-3. Accordingly, the apparatus 200 for controlling a smart airbag system using a dual chamber structure can control the inflation force for inflating the airbag 230 by varying the number of the safety bursting disks 220-5 which are burst.

The stand pipe 220-4 is disposed between the gas chamber 220-1 and the fluid chamber 220-2, thereby separating the chambers 220-1 and 220-2 from each other.

The stand pipe 220-4 supports the piston 220-3 so that the piston 220-3 moves along the surface of the stand pipe 220-4, thereby preventing the piston 220-3 from being removed.

The stand pipe 220-4 may have a space in which at least one safety bursting disk 220-5 is installed.

The bursting disk 220-5 can be burst by fluid which is stored in the fluid chamber 220-2 and receives the kinetic energy of the piston 220-3. The fluid which is stored in the space, which is formed as the safety bursting disk 220-5 is burst, within the fluid chamber 220-2 is ejected from the gas chamber 220-1 and injected as hot gas into the airbag 230 because of the kinetic energy of the piston 220-3.

The gas hole size adjusting unit 220-6 includes a motor 220-7, a gear 220-8, a rotating plate 220-9, and a fixed plate 220-10. The gas hole size adjusting unit 220-6 adjusts the size of a gas hole according to the optimum inflation force calculated from the occupant information, and controls the amount of cooled gas injected into the airbag 230 by the gas chamber 220-1.

The motor 220-7 rotates the rotating plate 220-9 by sending rotational force via the gear 220-8 according to the size of the gas hole which is determined according to the optimum inflation force for the air bag 230 which is calculated from the occupant information. The rotating plate 220-9 has a plurality of holes through which the cooled gas can pass. The fixed plate 220-10 also has a plurality of holes which is arranged to correspond to the holes of the rotating plate 220-9. Accordingly, the gas hole size adjusting unit 220-6 can control the flow of the cooled gas injected into the airbag 230 from the gas chamber 220-1 by adjusting the size of the gas hole.

The airbag 230 can be inflated by the cooled gas which is injected into the airbag 230 according to the optimum inflation force calculated from the occupant information.

Figure 6:
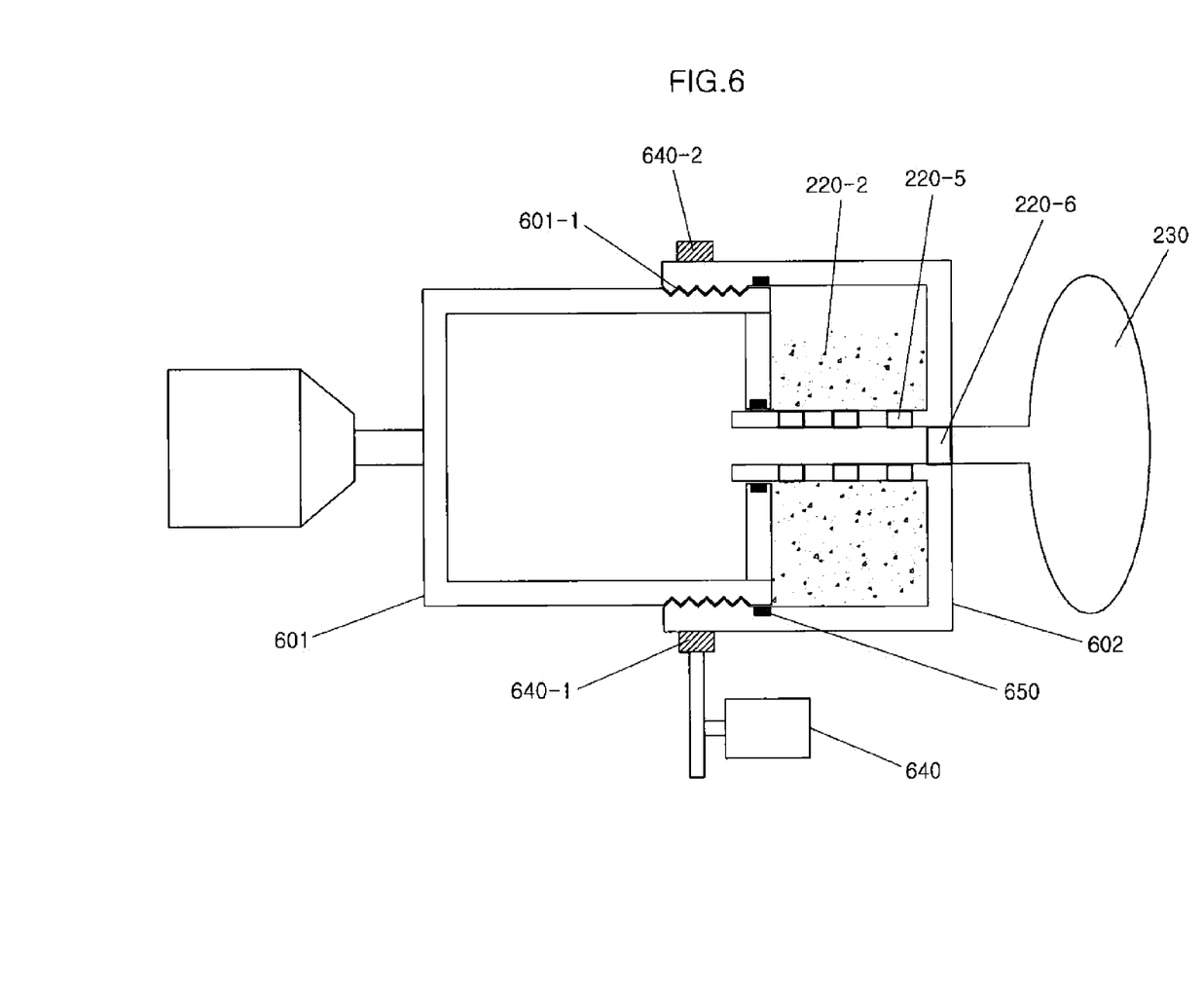
FIG. 6 is a schematic diagram illustrating an apparatus for controlling a smart airbag system using a dual chamber structure according to a second embodiment of the present invention.

FIG. 6 is a schematic view illustrating an apparatus for controlling a smart airbag system using a dual chamber structure according to a second embodiment of the present invention. With reference to FIG. 6, the cooling chamber 220 shown in FIG. 2 includes a fixed body 601 and a rotating body 602 which performs linear motion while rotating along the outside surface of the fixed body 601 in a circumferential direction.

For this movement, the outside surface of one end portion of the fixed body has screw treads 601-1 and the inside surface of one end portion of the rotating body 602 has screw threads.

The cooling chamber additionally includes a second motor 640 which rotates the rotating body 602, a first gear 641 connected to the second motor 640, and second gears 640-1 and 640-2 disposed the outside surface of the end portion of the rotating body 602. That is, the outside surface is the opposite surface of the inside surface on which the screw threads are formed. The first gear 641 and the second gears 640-1 and 640-2 may be worm gear type or pulley-and-belt type.

A portion between the stand pipe 220-4 and the fixed body 601, and a portion between the fixed body 601 and the rotating body 602 are hermetically sealed. For this sealing, a sealing element 650 is installed between the fixed body 601 and the inside surface of the rotating body 602.

In addition, a plurality of safety bursting disks 220-5 may be installed within the stand pipe 220-4.

Figure 7:
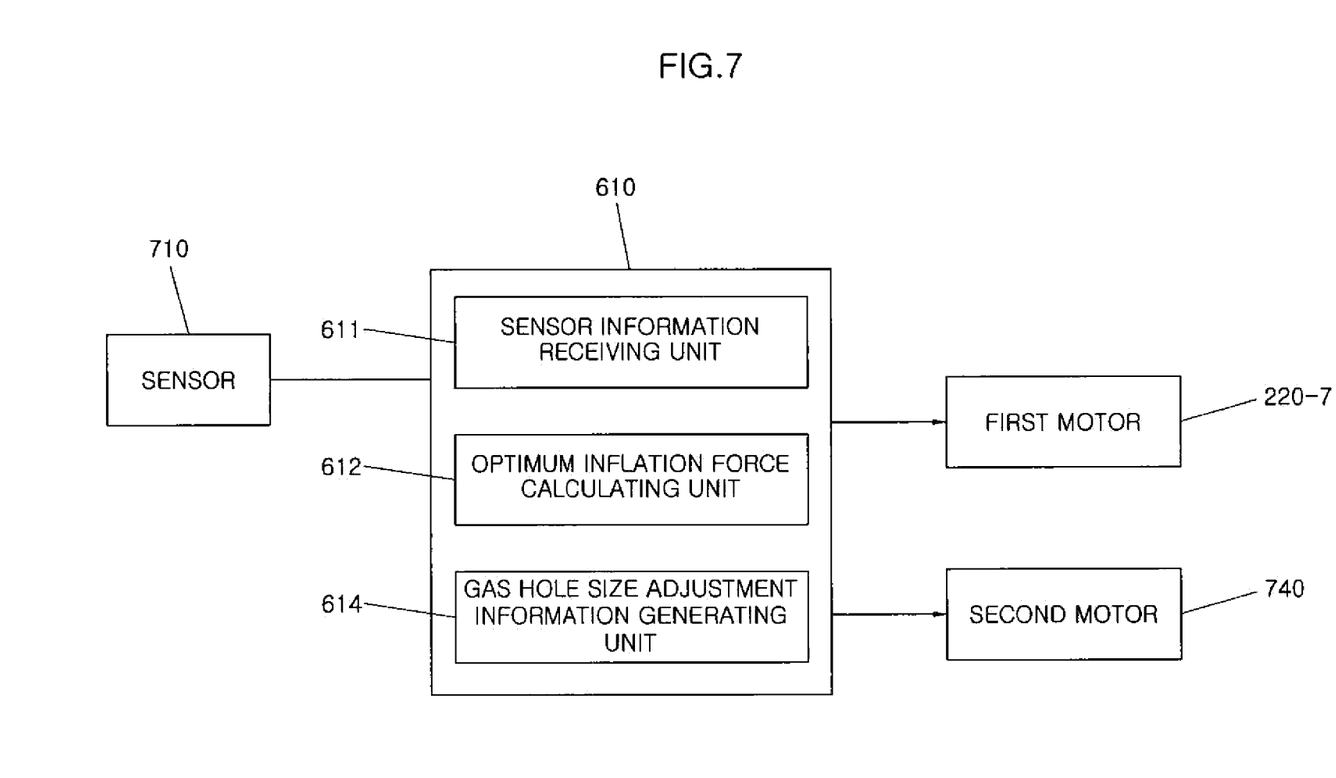
FIG. 7 is a block diagram illustrating a controller for the apparatus for controlling the smart airbag system shown in FIG. 6.

FIG. 7 is a block diagram illustrating a controller for the apparatus for controlling the smart airbag system shown in FIG. 6. With reference to FIG. 7, a controller 610 includes: a sensor information generating unit 611, an optimum inflation force calculating unit 612, and a gas hole size adjustment information generating unit 614.

The sensor information generating unit 611 receives a detection value output from a sensor 710 mounted in a vehicle and generates the occupant information.

The occupant information may include at least one information item selected from among: information about presence and absence of an occupant, information about whether an occupant is wearing a seat belt, information about presence and absence of a child seat, information about the height of an occupant, information about the weight of an occupant, and information about the seating posture of an occupant. The sensors 710 may include a seat position sensor, a seat belt buckle sensor, a child seat detection sensor, an occupant position sensor, an infrared sensor, an ultrasonic sensor, and an occupant weight sensor. The sensor information generating unit 611 can generate the occupant information by receiving a detection value measured by the sensor 710.

The optimum inflation force calculating unit 612 calculates the optimum inflation force for the air bag 230 from the occupant information generated by the sensor information generating unit 611.

The gas hole size adjustment information generating unit 614 generates gas hole size information used to control operation of the first motor 220-7 which adjusts the size of the gas hole from the optimum inflation force calculated by the optimum inflation force calculating unit 612.

Although not illustrated in the drawings, in addition to the information described above, other information may be generated in the controller 610. For example, gas generator driving information used to control operation of the gas generator 620 can be generated from the optimum inflation force calculated by the optimum inflation force calculating unit 612, and piston position information used to control operation of the second motor 640, which can change the position of the piston, can be generated from the optimum inflation force information calculated by the optimum inflation force calculating unit 612.

The first motor 220-7 can control the amount of cooled gas injected into the airbag from the gas chamber by varying the size of the gas hole according to the gas hole size information generated by the gas hole size adjustment information generating unit 614.

The second motor 640 rotates the rotating body 602 according to the piston position information.

Individual units of the controller 610 according to the embodiment of the present invention are illustrated in the form of separate units in order to imply that the individual units can be functionally and/or logically separated, but the illustration does not mean that the individual units are necessarily physically separated or implemented necessarily in separate codes.

The term "functional unit" in this disclosure may represent a functional or structural combination of hardware for implementing the technical spirit of the present invention and software for driving the hardware. That is, the functional unit may be a predetermined code and a logical unit of a hardware resource by which the predetermined code is executed. Those skilled in the art will easily understand that the functional unit does not mean necessary physically connected codes or one kind of hardware.

Although the invention is described with reference to specific items such as specific structural elements, to merely some embodiments, and to drawings, such specific details disclosed herein are merely representative for purposes of helping more comprehensive understanding of the present invention. The present invention, however, is not limited to only the example embodiments set forth herein, and those skilled in the art will appreciate that the present invention can be embodied in many alternate forms.

Accordingly, the present invention is intended to cover not only the exemplary embodiments, but also various alternatives, modifications, equivalents and other embodiments that may be included within the spirit and scope of the present invention as defined by the appended claims.

What is claimed is:

1. An apparatus for controlling a smart airbag system using a dual chamber structure, the apparatus comprising:
   a gas generator which ejects hot gas when a crash occurs;
   a gas chamber which is supplied with the hot gas ejected from the gas generator and transfers the supplied gas into an airbag;
   a fluid chamber which cools the hot gas by spraying stored fluid before the hot gas is introduced into the airbag;
   a piston which is installed in the chamber and compresses the fluid using the hot gas;
   a safety bursting disk which is burst by being pressed by the piston so that the fluid is sprayed and the hot gas is cooled;
   a gas hole size adjusting unit which changes a size of a gas hole which is a factor to determine an amount of the cooled gas injected into the airbag; and
   a controller which controls operation of the gas generator or the gas hole size adjusting unit according to an inflation force for the airbag, which is calculated using occupant information generated by a sensor.

2. The apparatus according to claim 1, wherein the gas generator includes a plurality of gas generators.

3. The apparatus according to claim 1, wherein the gas hole size adjusting unit comprises:
   a fixed plate with a plurality of holes;

a rotating plate with a plurality of holes which is arranged to correspond to the holes of the fixed plate and through which the cooled gas moves to the airbag; and a motor which drives the rotating plate via a gear.

4. The apparatus according to claim 1, wherein the occupant information includes at least one information item selected from among: information about presence and absence of an occupant, information about whether an occupant is wearing a seat belt, information about presence and absence of a child seat, information about a height of an occupant, information about a weight of an occupant, and information about a seating posture of an occupant.

5. The apparatus according to claim 1, wherein the occupant information is generated from a detection value measured by at least one sensor selected from among: a seat position sensor, a seat belt buckle sensor, a child seat detection sensor, an occupant position sensor, an infrared sensor, an ultrasonic sensor, and an occupant weight sensor.

6. The apparatus according to claim 1, wherein the fluid is a coolant.

7. The apparatus according to claim 1, wherein the safety bursting disk comprises a plurality of safety bursting disks.

8. The apparatus according to claim 1, further comprising: a stand pipe which separates the gas chamber and the fluid chamber from each other and functions to guide motion of the piston.

9. An apparatus for controlling a smart airbag system using a dual chamber structure, the apparatus comprising:

a gas generator which ejects hot gas when a crash occurs;

a fixed body which is supplied with the hot gas ejected from the gas generator;

a rotating body which cools the hot gas by spraying stored fluid before the hot gas is introduced into an airbag, by rotating along an outside surface of a portion of the fixed body in a circumferential direction;

a safety bursting disk which is burst by pressing force from the rotating body as the rotating body rotates;

a gas hole size adjusting unit which varies a size of a gas hole which is a factor to determine an amount of the cooled gas injected into the airbag; and a controller which controls operation of the gas generator or the gas hole size adjusting unit according to an inflation force for the airbag which is generated from occupant information generated by a sensor.

10. The apparatus according to claim 9, wherein the gas hole size adjusting unit comprises:

a fixed plate with a plurality of holes;

a rotating plate with a plurality of holes which is arranged to correspond to the holes of the fixed plate and through which the cooled gas moves to the airbag; and a motor which drives the rotating plate via a gear.

11. The apparatus according to claim 9, wherein an outside surface of a portion of the fixed body and an inside surface of a portion of the rotating body have respective screw threads.

12. The apparatus according to claim 9, further comprising:

a motor, a first gear connected to the motor; and a second gear formed on an outside surface of a portion of the rotating body.

13. The apparatus according to claim 12, wherein the first gear and the second gear are worm gear type or pulley-and-belt type.

14. The apparatus according to claim 9, further comprising:

a stand pipe disposed inside the rotating body, the stand pipe functioning as a guide to guide the fixed body.

15. The apparatus according to claim 14, wherein a sealing element is installed between the fixed body and the inside surface of the rotating body in order to seal a portion between the stand pipe and the fixed body or a portion between the fixed body and the rotating body.

* * * * *